（12）United States Patent
Han et al.

(10) Patent No.: US 10,316,719 B2
(45) Date of Patent: Jun. 11, 2019

(54) METHOD AND CONTROL ASSEMBLY FOR OPERATING AN EXHAUST GAS SYSTEM

(71) Applicant: Daimler AG, Stuttgart (DE)

(72) Inventors: Zhiping Han, Canton, MI (US); Bryant Pham, Canton, MI (US); Justin Kosik, Plymouth, MI (US); Charles-Benoit Chaumette, West Bloomfield, MI (US)

(73) Assignee: Daimler AG, Stuttgart (DE)

( * ) Notice: Subject to any disclaimer, the term of this patent is extended or adjusted under 35 U.S.C. 154(b) by 66 days.

(21) Appl. No.: 15/329,974

(22) PCT Filed: Jun. 20, 2015

(86) PCT No.: PCT/EP2015/001250
§ 371 (c)(1),
(2) Date: Jan. 27, 2017

(87) PCT Pub. No.: WO2016/015800
PCT Pub. Date: Feb. 4, 2016

(65) Prior Publication Data
US 2017/0268398 A1 Sep. 21, 2017

(30) Foreign Application Priority Data
Jul. 28, 2014 (GB) .................................. 1413302.9

(51) Int. Cl.
*F01N 3/20* (2006.01)
*F01N 11/00* (2006.01)
*F01N 9/00* (2006.01)

(52) U.S. Cl.
CPC .......... *F01N 3/208* (2013.01); *F01N 3/2066* (2013.01); *F01N 11/00* (2013.01); *F01N 9/00* (2013.01);
(Continued)

(58) Field of Classification Search
CPC ........ F01N 11/00; F01N 3/2066; F01N 3/208; F01N 9/00; F01N 2550/05;
(Continued)

(56) References Cited

U.S. PATENT DOCUMENTS 8,209,964 B2   7/2012   Kesse
8,590,289 B2   11/2013  Maki
(Continued)

FOREIGN PATENT DOCUMENTS

CN   100419229 C   9/2008
CN   100587235 C   2/2010
(Continued)

OTHER PUBLICATIONS

PCT/EP2015/001250, International Search Report dated Sep. 24, 2015 (Two (2) pages).
(Continued)

*Primary Examiner* — Audrey K Bradley
*Assistant Examiner* — Dapinder Singh
(74) *Attorney, Agent, or Firm* — Crowell & Moring LLP

(57) ABSTRACT

A method and a control assembly for operating an exhaust gas system of a motor vehicle is disclosed. Measuring values are evaluated, which indicate a content of nitrogen oxides in an exhaust gas downstream of a catalytic device. The catalytic device is adapted to diminish the content of nitrogen oxides in the exhaust gas produced by an engine of the motor vehicle. Based on the measuring values a quality of a reducing agent supplied to the catalytic device is assessed. The method includes determining whether reducing agent has been filled into a storage tank. A plurality of measuring values is captured during a predetermined period of time, and a magnitude and a frequency of the plurality of measuring values are taken into account to assess the quality of the reducing agent.

7 Claims, 2 Drawing Sheets

(52) U.S. Cl.
CPC .... *F01N 2550/05* (2013.01); *F01N 2560/026* (2013.01); *F01N 2610/02* (2013.01); *F01N 2900/0418* (2013.01); *F01N 2900/1402* (2013.01); *F01N 2900/1818* (2013.01); *Y02A 50/2325* (2018.01); *Y02T 10/24* (2013.01); *Y02T 10/47* (2013.01)

(58) Field of Classification Search
CPC ........... F01N 2560/026; F01N 2610/02; F01N 2900/0418; F01N 2900/1402; F01N 2900/1818; Y02T 10/24; Y02T 10/47
USPC .................................. 60/274, 277, 286, 295
See application file for complete search history.

(56) References Cited

U.S. PATENT DOCUMENTS

| | | | |
|---|---|---|---|
| 2005/0207936 A1 | 9/2005 | Berryhill et al. | |
| 2008/0178656 A1 | 7/2008 | Nieuwstadt et al. | |
| 2008/0276598 A1* | 11/2008 | Gresens | F01N 3/208 60/286 |
| 2009/0049899 A1* | 2/2009 | Hjorsberg | F01N 3/2066 73/114.75 |
| 2009/0293451 A1* | 12/2009 | Kesse | F01N 3/2066 60/274 |
| 2010/0037599 A1* | 2/2010 | Toshioka | F01N 3/2066 60/295 |
| 2012/0000270 A1* | 1/2012 | Narita | F01N 11/00 73/23.31 |
| 2014/0033683 A1 | 2/2014 | Wei et al. | |
| 2014/0050642 A1 | 2/2014 | Yacoub et al. | |

FOREIGN PATENT DOCUMENTS

| | | |
|---|---|---|
| EP | 3 084 162 B1 | 10/2016 |
| GB | 2516018 A | 1/2015 |
| GB | 2518035 A | 3/2015 |

OTHER PUBLICATIONS

Great Britain Search Report issued in Great Britain counterpart application No. GB1413302.9 dated Feb. 6, 2015 (Three (3) pages).

Chinese Office Action issued in Chinese counterpart application No. 201580032377.8 dated Jul. 20, 2018, with partial English translation (Ten (10) pages).

European Intention to Grant issued in European counterpart application No. 15 731 516.9-1004 dated Mar. 21, 2018 (Seven (7) pages).

* cited by examiner

METHOD AND CONTROL ASSEMBLY FOR OPERATING AN EXHAUST GAS SYSTEM

BACKGROUND AND SUMMARY OF THE INVENTION

The invention relates to a method for operating an exhaust gas system, in particular of a vehicle, in which measuring values are evaluated which indicate a content of nitrogen oxides in an exhaust gas downstream of a catalytic device. The catalytic device is adapted to diminish the content of nitrogen oxides in the exhaust gas produced by an engine of motor vehicle. Based on the measuring values a quality of a reducing agent is assessed, which is supplied to the catalytic device. The method comprises the step of determining whether reducing agent has been filled into a storage tank. Furthermore, the invention relates to a control assembly for operating an exhaust gas system.

Due to stringent exhaust emissions regulations, engines such as diesel engines for vehicles are generally equipped with an exhaust gas aftertreatment system. Such an exhaust gas aftertreatment system can comprise a catalytic device which is designed as a so-called selective catalytic reduction (SCR) catalyst. The function of the SCR catalyst is to convert nitrogen oxides (NOx) to non-harmful nitrogen (N2) and water (H2O) via a catalytic reaction between the nitrogen oxides and ammonia (NH3).

Ammonia as a reducing agent is supplied to the exhaust gas stream entering the catalytic device by injection of a fluid into the hot exhaust gas, which is known as a diesel exhaust fluid (DEF). The diesel exhaust fluid can in particular be a urea-water solution with 32.5% urea. The injected diesel exhaust fluid releases ammonia through a hydrolysis reaction upon injection into the hot exhaust gas.

The ammonia is first stored in the SCR catalyst. Then the ammonia reacts with NOx molecules on the surface of the SCR catalyst. If ammonia is oversupplied, it may not all be stored in the SCR catalyst and may slip out of the SCR catalyst and get into a tailpipe of the exhaust gas system. Since the slipped ammonia is a nuisance and an odorous gas, the SCR is usually followed by a short section called an ammonia slip catalyst (ASC). The ammonia slip catalyst converts slipped ammonia to nitrogen and water. The dominant reaction is to convert ammonia to N2 and H2O. However, if the ammonia slip amount is too high, some of the ammonia will be converted to nitrogen oxides by the ammonia slip catalyst. With an increase of the ammonia slip into the ASC catalyst an increasing amount of nitrogen oxides can be created. If the ammonia slip is very high, the NOx creation will become significant.

One of the factors critically impacting the effectiveness of NOx reduction is the ratio of the molecules between NOx and ammonia, the so-called ammonia-to-NOx ratio (ANR). There is a narrow ANR range which gives maximum conversion. If the ammonia is undersupplied, the NOx conversion efficiency is reduced, caused by the shortage in ammonia supply. Thus, ammonia undersupply can cause NOx emissions to be incompliant. If on the other hand the ammonia is oversupplied, some of the unused ammonia may slip out the SCR catalyst. If the slippage is high enough, extra NOx can be created in a downstream ammonia slip catalyst.

The undersupply of ammonia can have multiple root causes. One cause could be a dilution of the reducing agent, i.e., the diesel exhaust fluid, which results in a lower ammonia content with the same injection rate. Dilution of the diesel exhaust fluid can be done by water, but is not limited to water only. The diesel exhaust fluid can also be diluted by other fluids which are free of ammonia. If a diluted diesel exhaust fluid is utilized and the diesel exhaust fluid injection rate is not corrected, the NOx conversion efficiency will drop. Consequently, tailpipe NOx emissions may exceed regulated levels.

For the reasons mentioned above, some emissions regulations require the implementation of an on-board diagnostics means to monitor the quality of the reducing agent and to take certain actions once the deterioration of the reducing agent's quality reaches a level which will cause the tailpipe NOx to exceed the regulated limit.

U.S. Pat. No. 8,209,964 B2 describes a method for assessing the quality of a reducing agent which is injected into an exhaust system upstream of an SCR catalyst. A first sensor generates a first signal indicative of an amount of nitrogen oxides entering the SCR catalyst. A second sensor generates a second signal indicative of an amount of remaining nitrogen oxides downstream of the SCR catalyst. A third sensor is utilized to detect whether a change in the NOx reduction efficiency is associated with a fill event of the reducing agent. If this is the case, a dramatic change in the NOx reduction leads to the conclusion that the added fluid is not the reducing agent. If only a moderate drop of the reduction efficiency is observed, the dosing of the reducing agent is increased. If such a reaction results in an improvement of the NOx reduction, the future dosing is adjusted accordingly and the operator is warned that an improper reducing agent has been filled into a storage tank for the reducing agent.

Such a method is quite complex, as three sensors are utilized to assess the quality of the reducing agent. Further, as the method uses absolute sensor signal readings, the method is sensitive to a drifting of the sensor signal. This may lead to an unreliable determination of the reducing agent's quality.

Another approach is to utilize a quality sensor which is installed in the diesel exhaust fluid tank. Such a commercially available sensor can be utilized for quality monitoring and the detection of a deterioration of the quality of the diesel exhaust fluid. Generally, the DEF quality is checked through density sensing. For this, the sensor is dipped into the diesel exhaust fluid in the tank. However, the sensor has to cover the whole depth of the diesel exhaust fluid tank in order to detect a stratified dilution of the fluid in the tank. For example, an ultrasound sensor can be utilized to measure the density of the diesel exhaust fluid. However, there are other types of sensors based on electrical current conductivity, thermal conductivity etc. The signal of such a quality sensor can be utilized to correct the DEF injection rate.

However, installing a DEF quality sensor in a DEF tank leads to increased costs. Further, there are added monitoring requirements for the sensor itself. One of the requirements is the sensor signal's rationality check, which can be very difficult to do as there is no good reference point for comparison. Further, there is potentially a DEF stratification of water and urea after the DEF experiences freezing and thawing at low enough ambient temperature. Under such conditions the signal error increases. Further, the sensor output can be affected by different diluent agents utilized. Such a reaction of the sensor is known as a cross sensitivity.

It is therefore an object of the present invention to provide a method and a control assembly of the initially mentioned kind, which is particularly simple and reliable in assessing the quality of the reducing agent.

In the method according to the invention, a plurality of measuring values is captured during a predetermined period of time, and a magnitude and a frequency of the plurality of measuring values are taken into account to assess the quality of the reducing agent. Thus, the method only requires the evaluation of measuring values of a single sensor indicating the content of nitrogen oxides in the exhaust gas, wherein this sensor is located downstream of the catalytic device. Additionally, means for determining whether reducing agent has been filled into the storage tank are utilized, such as a storage tank level sensor. As it is not necessary to calculate the NOx reduction efficiency by comparing the signals from a first NOx sensor located upstream of the catalytic device with the signals from a second sensor located downstream of the catalytic device, the method is particularly simple. It is sufficient to evaluate the measuring values of the one sensor only, which is located downstream of the catalytic device.

If a decrease in conversion performance of the catalytic device occurs subsequent to a refilling of the storage tank, it can be concluded that the reducing agent filled into the storage tank had an improper quality. Applying a magnitude-frequency analysis to the measuring values or signals provided by the sensor located downstream of the catalytic device thus leads to a particularly simple and reliable way of assessing the quality of the reducing agent. The method thus provides an on-board technique to detect an improper quality of the reducing agent such as a dilution of the reducing agent without a physical quality sensor.

In an advantageous embodiment a magnitude of a measuring value captured within the predetermined period of time is related to an average or to a median of the magnitudes of the plurality of measuring values captured during the predetermined period of time. The related magnitude is then utilized to assess the quality of the reducing agent. As the magnitude is related to the average or the median, a relative magnitude-frequency analysis is utilized instead of an absolute magnitude-frequency analysis. Thus, a particularly high detection resolution is achieved with either a new or a fresh catalytic device or an aged catalytic device.

Further, by utilizing related magnitudes, the method tolerates signal drift and is thus particularly reliable for detecting a deterioration of the reducing agent's quality. By relating the magnitude to an average or to a median of magnitudes, a variation of the absolute magnitude of the measuring values does not have an unwanted influence on the determination of the conversion performance and thus the quality of the reducing agent. For example, an aged catalytic device with a sufficient supply of reducing agent will not be mistakenly detected as a supply of diluted reducing agent which leads to higher absolute magnitudes of the signals or measuring values indicating the content of nitrogen oxides in the exhaust gas downstream of the catalytic device.

In a further advantageous embodiment a moving median is utilized for relating the magnitude of each measuring value captured within the predetermined period of time. In a particularly simple configuration the moving median is a mathematic average of the magnitudes of the plurality of measuring values which are symmetrically arranged around the magnitude or value to be related to the moving median. Thus, the influence of an overall trend of the measuring value magnitudes can be detected and is not falsely interpreted as an inappropriate quality of the reducing agent supplied to the exhaust gas. Thus, utilizing the moving median enhances the reliability of the quality assessment.

It has further proven to be advantageous if in relating the magnitude to the average or median a difference between the magnitude of the measuring value to be related and the average or median is calculated. By taken into consideration this difference, the noise of the measuring values or signals is detected. This is based on the finding that the quantity of the reducing agent stored in the catalytic device has a damping effect on sudden variations in inflowing nitrogen oxides, in particular on sudden increases of inflowing nitrogen oxides. If the level of reducing agent stored in the catalytic device is reduced or if there is no stored reducing agent left at all, the reduced damping capacity to the inflowing nitrogen oxide variations results in the noisiness of the tail pipe nitrogen oxide sensor's signal. Therefore, by taking into account the noisiness a degree of shortage in the amount of the reducing agent supplied to the catalytic device can be readily detected. Such a shortage can be associated with a quality deterioration of the reducing agent occurring after a refilling event during which the reducing agent is introduced into the storage tank.

Further advantageously a total of absolute values of differences is created in utilizing the related magnitude to assess the quality of the reducing agent supplied to the exhaust gas. Such a total of absolute values is particularly easy to handle and has proven to be a very robust detection tool.

A particularly reliable assessment of the quality of the reducing agent supplied to the exhaust gas is achieved, if the total of absolute values of differences is created over a sampling period which comprises a plurality of the predetermined periods of time. The sampling period can in particular be in the range of 2 minutes to 20 minutes, preferentially in the range of 5 minutes to 15 minutes. A particularly good result in the quality assessment is achieved, if the sampling period is about 10 minutes.

Further, it is proven advantageous, if the predetermined period of time is in the range of 5 seconds to 60 seconds, in particular in the range of 10 seconds to 30 seconds. This is based on the finding that a period of time which is too short may result in an inability to reliably detect a dilution of the reducing agent following a refill event. If, however, the predetermined period of time is too long, the sensitivity for noise detection is decreased. Therefore, the length of the predetermined period of time can in particular be about 20 seconds.

Preferably, the reducing agent is assessed to have an improper quality if the sum of differences between a plurality of totals is greater than a threshold value. As a relatively larger value of the total indicates a lower supply of the reducing agent to the catalytic device, increasing totals over a sampling period indicate an improper quality of the reducing agent, in particular a dilution of the reducing agent. This allows for a particularly reliable dilution detection in an open-loop controlled dosing system of the reducing agent. As an example the dilution of the reducing agent can be readily detected by comparing the cumulative incremental change of subsequent totals with the threshold value.

In a further advantageous embodiment, an amount of the reducing agent which is supplied to the exhaust gas is modified. Thus, a correction of the dosing rate of the reducing agent is performed in case a change of the reducing agent's quality is determined. This allows for compliance with emissions regulations despite a deterioration in the quality of the reducing agent.

The reducing agent can further be assessed to have an improper quality if a value which is based on a plurality of modifications of the amount of the reducing agent supplied to the exhaust gas is greater than a threshold value. Such a procedure is in particular useful for closed-loop controlled reducing agent dosing systems. This is based on the finding that the reducing agent can be assessed to have an improper quality, in particular be diluted, if despite the modification of the amount of the reducing agent supplied to the exhaust gas, no or only a limited performance improvement of the catalytic device is observed. In such a scenario, the cumulative incremental change of the value which is based on the plurality of modifications can be utilized to detect a dilution of the reducing agent.

A particularly simple implementation of the method is achieved if a sum of differences between a plurality of correction factors is utilized as the value which is based on the plurality of modifications.

The control assembly according to the invention for operating an exhaust gas system comprises an evaluation unit adapted to evaluate measuring values which indicate a content of nitrogen oxides in an exhaust gas downstream of a catalytic device. The catalytic device is adapted to diminish the content of nitrogen oxides in the exhaust gas produced by an engine. A detection unit of the control assembly is adapted to assess a quality of a reducing agent supplied to the catalytic device based on the measuring values. The detection unit is further adapted to determine whether reducing agent has been filled into a storage tank and to take into account a magnitude and a frequency of a plurality of measuring values captured during a predetermined period of time in order to assess the quality of the reducing agent.

The advantages and preferred embodiments described for the method according to the invention also apply to the control assembly according to the invention and vice versa.

The features and feature combinations mentioned above in the description as well as the features and feature combinations mentioned below in the description of figures and/or shown in the figures alone are usable not only in the respectively specified combination but also in other combinations or alone without departing from the scope of the invention. Thus, implementations not explicitly shown in the figures or explained, but which result and can be generated by separated feature combinations of the explained implementations are also to be considered encompassed and disclosed by the invention.

Further advantages, features and details of the invention are apparent form the claims, the following description of preferred embodiments as well as based on the drawings.

DETAILED DESCRIPTION OF THE DRAWINGS

Figure 1:
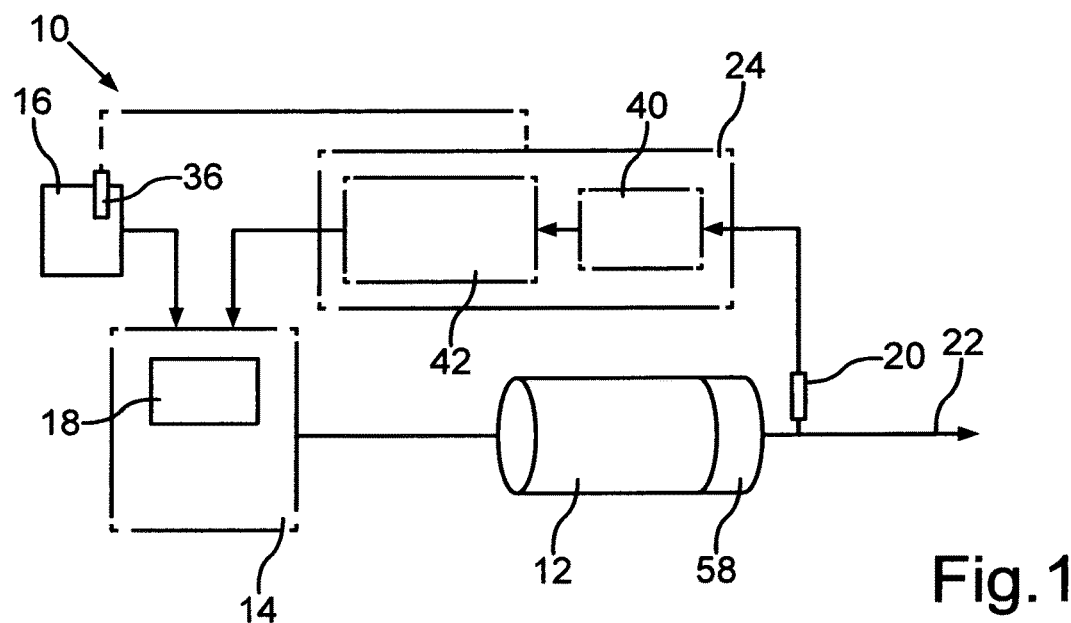
FIG. 1 is a control assembly for operating an exhaust gas system, in which a detection unit detects a dilution of a urea-water-solution supplied into the exhaust gas upstream of an SCR catalyst based on signals of an NOx sensor.

FIG. 1 shows a control assembly 10 for operating an exhaust gas system of a vehicle. Exhaust gas from an engine (not shown) is treated in a catalytic device in the form of a SCR catalyst 12. In the SCR catalyst 12, ammonia (NH3) reacts with nitrogen oxides (NOx) in the exhaust gas in a selective catalytic reduction (SCR) reaction to form nitrogen and water. A reducing agent in the form of a urea-water solution is injected to the exhaust gas upstream of the SCR catalyst 12 by a dosing unit 14. The urea-water solution which is also called diesel exhaust fluid (DEF) releases the ammonia in a hydrolysis reaction after being mixed with the hot exhaust gas. A storage tank 16 is provided for storage of the urea-water solution which is injected into the exhaust gas upstream of the SCR catalyst 12.

Input signals are provided to a controller 18 of the dosing unit 14 depending on engine operating parameters. The control assembly 10 is designed to detect insufficient ammonia supply to the SCR catalyst 12 and preferably to closed-loop control the dosing of the diesel exhaust fluid or such a reducing agent into the exhaust gas.

The closed-loop control is based on a magnitude-frequency analysis of signals or measuring values provided by an NOx sensor 20. The NOx sensor may provide a signal or measuring values correlating with the NOx concentration in ppm (parts per million) in a tail pipe 22 of the exhaust gas system. The tail pipe 22 is a section of an exhaust gas pipe of the exhaust gas system, which is located downstream of the SCR catalyst 12. The analysis looks at the magnitude and frequency of the NOx sensor's 20 signal reading and, thus, of the measured NOx concentration downstream of the SCR catalyst 12.

If the SCR catalyst's 12 ammonia supply is sufficient and within a normal range, the tail pipe 22 NOx sensor's 20 signal reading is generally low and smooth because of a good NOx conversion efficiency of the SCR catalyst 12. With the right amount of ammonia supplied to the SCR catalyst 12, not only the SCR catalyst 12 will have good NOx conversion, but more importantly, there will be extra ammonia stored in the SCR catalyst 12. This stored ammonia provides a damping effect by maintaining good conversion when there is a sudden increase in inflowing NOx or when there are sudden NOx fluctuations. The stored ammonia thus maintains a smooth tail pipe 22 NOx output. The more ammonia is stored in the SCR catalyst 12 the better is the damping effect and the smoother the tail pipe NOx output.

If there is a shortage in the amount of ammonia supplied to the SCR catalyst 12, the level of the stored ammonia is reduced. If short supply gets severe enough, there is no stored ammonia left in the SCR catalyst 12 at all. Under such conditions, due to the reduced damping capacity, with an inflowing NOx variation, the tail pipe NOx sensor's 20 signal reading becomes noisy. Magnitude and frequency of the noise increases with the increased degree of shortage in ammonia supply.

When the SCR catalyst 12 is comparatively new or fresh and the ammonia supply is within a normal range the corresponding tail pipe 22 NOx level is low and the signal is smooth. For an aged SCR catalyst 12 with normal ammonia supply the tail pipe 22 NOx level is overall high but the signal is still relatively smooth. If, however, the ammonia supplied to the fresh SCR catalyst 12 is reduced the tail pipe 22 NOx signal becomes both higher and noisier.

This general behavior of the NOx sensor's 20 signal reading can be utilized to detect the SCR catalyst's 12 ammonia supply condition. In other words the tail pipe 22 NOx sensor 20 signals magnitude and frequency characteristics are analyzed to detect underdosing or overdosing of ammonia into the exhaust gas. The magnitude-frequency analysis result can then be utilized to adjust the dosing control in a closed-loop approach accordingly and bring it back to a normal level if ammonia supply deviates from a normal level to either the rich or the lean side.

Thus, the reducing agent supply can be changed to a limit without notifying a driver of the vehicle. The reason is that insufficient ammonia supply could be partially caused by a hardware malfunction which could lead to increased warranty costs if investigated, even though the malfunction is tolerable. If the supply increases above the limit, the driver can be notified, for example by a check engine light. The limit is based on the degree of tolerable malfunction of the exhaust gas aftertreatment system without damaging the system hardware.

A measurement tool for evaluating the level or amount of ammonia supplied to the SCR catalyst 12 is an integrated quantity which is called "lumped average relative magnitude-frequency" or in short LARMF. The LARMF is expressed below:

$$LARMF = \frac{1}{\tau} \int_0^\tau |(x_i - \tilde{x}_s)| dt$$

where
$x_i$=the tail pipe NOx sensor's 20 signal at data sampling time point 'i'
$\tilde{x}_s$=the signal's moving median at time 'i' for 's' sampling time period
$\tau$=the total time period of data sampling.

The LARMF quantity uses relative magnitude-frequency analysis instead of absolute magnitude-frequency analysis. Specifically the measuring value $x_i$ is related to a quantity $x_s$, which is the moving median at time point 'i' for a predetermined period of time or sampling time period 's'. The utilization of this relative magnitude-frequency analysis results in a high detection resolution with either a fresh SCR catalyst 12 or an aged SCR catalyst 12.

The moving median $x_s$ is a virtual signal. The moving median $x_s$ depends on the length of the predetermined period of time and thus on the number of measurements or measuring values taken within in this period of time. The moving median $x_s$ can for example be the mathematic average of s datapoints or measuring values which are symmetrically arranged around the measuring value $x_i$. The moving median calculation is arbitrary in the sense that the median value depends on how many measurements or measuring values are used, i.e., how the predetermined period of time is selected. A larger predetermined period of time makes LARMF bigger and vice versa. If the sampling time period is too small, LARMF will be too small to reliable detect insufficient dosing of ammonia to the exhaust gas.

However if the predetermined period of time is too long and thus 's' is too large, this may lead to a LARMF value that is too big, if the SCR catalyst 12 is aged. A proper selection of the sampling period of time and thus the median averaging the measuring values within this period of time is important in order to have both good ammonia supply level detection resolution and good separation from the impact of aging on the SCR catalyst 12. In other words, a good selection of the predetermined period of time and thus the number of measurements or measuring values taken within this period of time should result in a LARMF value which is large enough to detect an ammonia supply insufficiency, but which is still small enough, if an aged SCR catalyst 12 is monitored. The relative properties of the LARMF value include the utilization of an integration function which is constructed by the difference between the signal or measuring value $x_i$ and its moving median $x_s$ instead of the signal's absolute magnitude.

The LARMF equation above contains an integration function, i.e., a relative magnitude-frequency term. This integration function $$|(x_i - \tilde{x}_s)|$$

represents the absolute values of the differences between the measuring value $x_i$ and the moving median $x_s$ of measuring values. The LARMF value is than a sum or total of all these absolute values collected over the sampling period z.

For an aged SCR catalyst 12 the tail pipe 22 NOx signal's absolute magnitude is high but relatively smooth, if the SCR catalyst 12 is supplied with sufficient ammonia. Thus, the difference between the signal $x_i$ and its moving median $x_s$ will be very small, although the signal's absolute magnitude is high. As a consequence the integration function in the LARMF equation is very small too, and the resulting LARMF value is also very small. Thus, an aged SCR catalyst 12 with a normal amount of ammonia supplied to the exhaust gas will not be mistakenly detected as an ammonia short supply case since the LARMF value is very small.

As the LARMF value indicates the level of ammonia supplied to the SCR catalyst 12, the LARMF value can also be utilized to detect a dilution of the urea-water solution which can occur subsequent to a refilling event of the storage tank 16. This is due to the fact that a dilution of the urea-water solution leads to an ammonia short supply. Therefore the calculation of the LARMF value can be utilized to detect the presence of diluted reducing agent in the storage tank 16. Preferably, the LARMF calculation is activated whenever predefined operating conditions of the engine and the exhaust system are met. Consequently, the LARMF calculation is preferably on-hold whenever the conditions are not met.

Data sampling preferably can in particular take place if there are approximately steady state operating conditions. This avoids that highly transient operating conditions exist which would have an unwanted influence on the quality assessment accuracy.

When the accumulated calculation time reaches the preset sampling period $\tau$ or preset sampling time, a calculation cycle is completed and a new LARMF value is generated. The LARMF calculation cycle can then repeat over and over. A relatively larger value of LARMF indicates lower ammonia supply to the SCR catalyst 12 and vice versa. In an open-loop controlled reducing agent dosing system, the LARMF value can be used to detect a dilution of the reducing agent. In a closed-loop controlled reducing agent dosing system, a dosing correction factor resulting from the calculated LARMF value can be utilized to detect dilution of the reducing agent.

In an open-looped controlled urea-water solution or DEF dosing system, the LARMF value will increase if the reducing agent is diluted with an ammonia free diluent during a storage tank 16 refill event. This can, for example, occur when water is filled into the storage tank 16 instead of the urea-water solution. This results in a dilution of the reducing agent remaining in the storage tank 16. If the reducing agent dosing is not corrected, the LARMF value will reach a higher level in subsequent calculation cycles.

Figure 2:
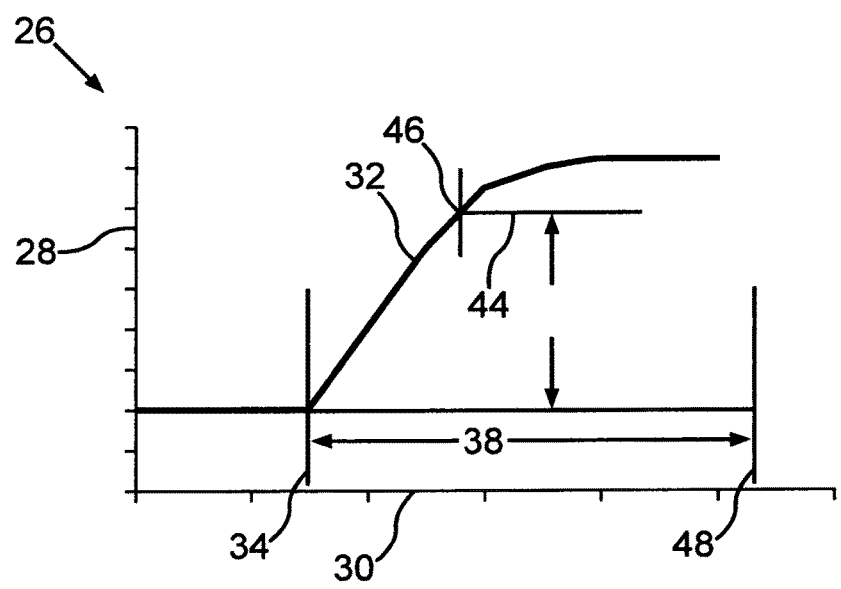
FIG. 2 is a graph illustrating dilution detection in an open-loop controlled dosing system of the urea-water solution.

FIG. 2 illustrates the concept of DEF dilution detection in an open-loop controlled DEF dosing system. For the dilution detection the control system 10 (see FIG. 1) comprises a detection unit 24, which is adapted to assess the quality of the reducing agent supplied to the SCR catalyst 12. The detection unit 24 is in particular adapted to detect a dilution of the reducing agent subsequent to a storage tank 16 refill event.

In a graph 26 shown in FIG. 2, an ordinate 28 indicates the LARMF value obtained during each calculation cycle, i.e., in a given sampling period τ. An abscissa 30 indicates the numbers of LARMF calculation cycles, and a curve 32 illustrates the variation of the LARMF values. As can be seen from the curve 32, the LARMF values here remain rather stable until a refill event 34 takes place, i.e., a rise in the liquid level in the storage tank 16 is observed. This refill event 34 can, for example, be detected by the utilization of a level sensor 36 installed in the storage tank 16 (see FIG. 1).

The level sensor 36 communicates a signal to the detection unit 24. As a consequence, the DEF dilution detection logic is activated. The dilution detection is conducted within a time window 38 comprising a number of LARMF calculation cycles or sampling periods r.

The LARMF values obtained during each sampling period τ are time averaged quantities from accumulated tail pipe 22 NOx sensor 20 signal samples processed according to the LARMF equation given above. The corresponding calculations are performed by a calculation unit 40 of the detection unit 24 (see FIG. 1).

The signal sampling can be piece-wise in length and can vary depending on engine operating conditions. The total length of piece-wise accumulated time, i.e., the length of the sampling period τ, can be predefined through a calibration setting. One LARMF calculation cycle is completed when the total accumulated signal sample time reaches the set length, i.e., the sampling period t. Thus, the calculation unit 40 has completed one LARMF value calculation. Upon completing the LARMF value calculation, the next LARMF calculation cycle is initiated and the same sampling process repeats. The length of the sampling period τ of each LARMF calculation cycle can vary from one calculation cycle to another.

However, a total time for the sampling period τ to determine the LARMF value can in particular be about 10 minutes. Within this total sampling period τ the predetermined periods of time during which the moving median is calculated can be about 20 seconds. Thus, after 10 minutes of data sampling one LARMF value can be generated accordingly until a new LARMF value is calculated and so on.

The detection unit 24 also comprises an evaluation unit 42 which is adapted to evaluate the measuring values or signals provided by the NOx sensor 20 by processing the data provided by the calculation unit 40. In the scenario illustrated in FIG. 2, the LARMF values obtained in consecutive LARMF calculation cycles increase. The evaluation unit 42 calculates the cumulative incremental change of LARMF values obtained in each calculation cycle. The evaluation unit 42 thus creates a sum of the differences between consecutively obtained LARMF values. In the scenario illustrated in FIG. 2, this sum or cumulative incremental change exceeds a threshold value 44 at a time 46. At this time 46, the detection unit 24 thus assesses the reducing agent to be diluted.

As a consequence, a driver of the vehicle can be warned, for example, by illuminating a special dashboard light. Additionally, the engine power can be de-rated. If the problem persists without proper correcting measures, a vehicle speed limit can be imposed. If the time passes on without a change of the LARMF value, the speed can further be reduced.

According to the graph shown in FIG. 2 the detection logic is performed until an end 48 of the time window 38 is reached.

Figure 3:
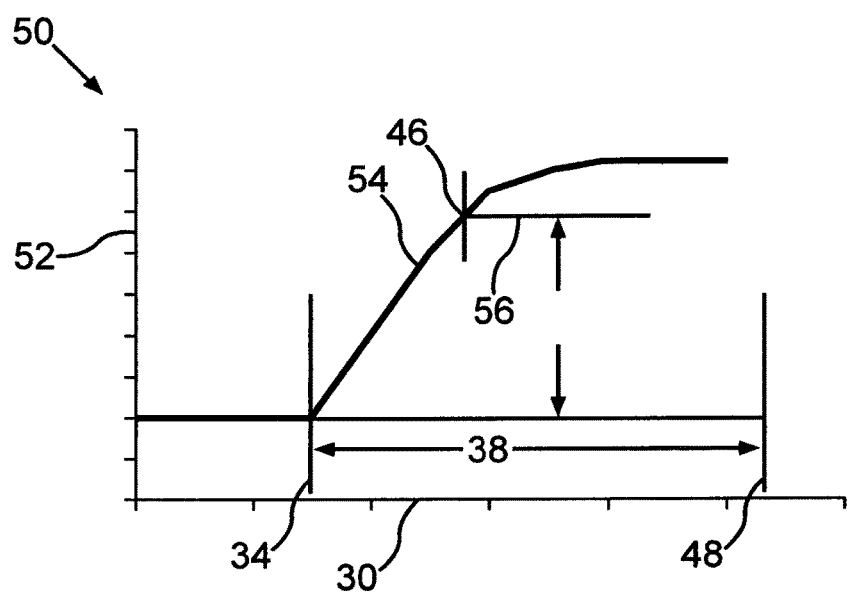
FIG. 3 is a further graph illustrating dilution detection in a closed-loop controlled dosing system of the urea-water solution.

FIG. 3 illustrates a dilution detection scenario for a closed-loop controlled DEF dosing system. A graph 50 shown in FIG. 3 is very similar to the graph 26 shown in FIG. 2. However, the ordinate 52 does not indicate the LARMF values but correction factors which are the output of the LARMF based closed-loop control. In the case of an undersupply of ammonia, which may be caused by the dilution of the reducing agent stored in the storage tank 16, a correction factor which is greater than the standard factor of 100% is applied to the actual DEF dosing rate to provide the right amount of ammonia.

In such a LARMF based closed-loop controlled DEF dosing system, the LARMF value is the feedback signal. As the DEF dilution subsequent to the refill event 34 will result in a low ammonia supply and a higher LARMF value, the reducing agent dosing closed-loop controller 18 (see FIG. 1) compares the calculated LARMF value with a pre-set LARMF target value at the end of each LARMF calculation cycle. If the LARMF value obtained by the calculation unit 40 is greater than the target value, the controller 18 will respond by increasing the dosing rate via a correction factor adjustment. This procedure is repeated with every LARMF calculation cycle until the calculated LARMF value is close enough to the target value. Herein an acceptable deviation range can be considered by a calibration setting. However, the correction factors will end up at increasingly higher levels as a result.

In this case, the dilution detection logic is still similar to that of the open-loop scenario shown in FIG. 2. However, a curve 54 in FIG. 3 does not illustrate the increasing LARMF values but increasing dosing correction factors. If the incremental correction factor change, i.e., a sum of differences between subsequent correction factors, exceeds a threshold value 56 at the time 46, dilution of the reducing agent is detected.

In this closed-loop scenario the dilution detection logic is also activated after the refill event 34 has occurred and been detected. The dilution detection is also conducted within the time window 38 defined by a number of LARMF calculation cycles. If within this detection window 38 the cumulative incremental change of the reducing agent dosing correction factor exceeds the threshold value 56, the dilution of the reducing agent is detected.

Thus, by utilizing the signals of the downstream NOx sensor 20 only, not only the conversion degree of the SCR catalyst 12 can be evaluated. In case the conversion performance is less than a threshold value subsequent to the refill event 34 of the storage tank 16, an improper quality of the reducing agent or DEF is diagnosed. To accomplish this, a magnitude-frequency analysis (M-F analysis) of the NOx sensor 20 signal is performed and the LARMF value based on this analysis is calculated. This LARMF value is utilized for evaluating the NOx performance and thus the DEF quality. A correction of the DEF dosing rate may be performed in case a change of the DEF quality is determined.

The SCR catalyst 12 can comprise an ammonia slip catalyst. This ammonia slip catalyst can be designed as a zone coated catalyst. In this case, a rear end 58 of the SCR catalyst can be coated again to form the ammonia slip catalyst. Accordingly, the ammonia slip catalyst can have two layers of coatings. The reaction which converts slipped ammonia to N2 and H2O mainly happens on the ammonia slip catalyst coating. With such an ammonia slip catalyst also an overdosing of ammonia can lead to an increase of nitrogen oxides downstream of the ammonia slip catalyst. Such an overdosing can also be detected by the utilization of the LARMF value and can be corrected by applying a lower dosing correction factor.

LIST OF REFERENCE SIGNS 10 control assembly
12 SCR catalyst
14 dosing unit
16 storage tank
18 controller
20 NOx sensor
22 tail pipe
24 detection unit
26 graph
28 ordinate
30 abscissa
32 curve
34 refill event
36 level sensor
38 time window
40 calculation unit
42 evaluation unit
44 threshold value
46 time
48 end
50 graph
52 ordinate
54 curve
56 threshold value
58 rear end

The invention claimed is:

1. A method for operating an exhaust gas system of a motor vehicle, comprising the steps of:
   evaluating measuring values of a sensor which indicate a content of nitrogen oxides in an exhaust gas downstream of a catalytic device adapted to diminish the content of nitrogen oxides in the exhaust gas produced by an engine of the motor vehicle;
   assessing a quality of a reducing agent supplied to the catalytic device based on the measuring values;
   determining whether reducing agent has been filled into a storage tank by a storage tank level sensor;
   capturing a plurality of the measuring values during a predetermined period of time and taking into account a magnitude and a frequency of the plurality of measuring values in the assessing of the quality of the reducing agent; and
   modifying an amount of the reducing agent which is supplied to the exhaust gas in response to the step of assessing determining that the quality of the reducing agent is improper;
   wherein a magnitude of a measuring value captured within the predetermined period of time is related to an average or to a median of the magnitudes of the plurality of measuring values captured during the predetermined period of time and the related magnitude is utilized in assessing the quality of the reducing agent;
   wherein a difference between the magnitude of the measuring value to be related and the average or median is calculated in assessing the quality of the reducing agent.

2. The method according to claim 1, wherein the reducing agent is assessed to have an improper quality if a value which is based on a plurality of modifications of the amount of the reducing agent is greater than a threshold value.

3. The method according to claim 2, wherein a sum of differences between a plurality of correction factors is utilized as the value which is based on the plurality of modifications.

4. The method according to claim 1, wherein in utilizing the related magnitude in assessing the quality of the reducing agent a total of absolute values of differences is created.

5. The method according to claim 4, wherein the total of absolute values of differences is created over a sampling period which comprises a plurality of predetermined periods of time.

6. The method according to claim 5, wherein the reducing agent is assessed to have an improper quality if a sum of differences between a plurality of totals is greater than a threshold value.

7. A control assembly for operating an exhaust gas system of a motor vehicle, comprising:
   an evaluation unit configured to evaluate measuring values of a sensor which indicate a content of nitrogen oxides in an exhaust gas downstream of a catalytic device, wherein the catalytic device is adapted to diminish the content of nitrogen oxides in the exhaust gas produced by an engine of the motor vehicle;
   a detection unit configured to assess a quality of a reducing agent supplied to the catalytic device based on the measuring values, to determine whether reducing agent has been filled into a storage tank, and to take into account a magnitude and a frequency of a plurality of measuring values captured during a predetermined period of time in order to assess the quality of the reducing agent; and
   a controller of a dosing unit, wherein the controller modifies an amount of the reducing agent which is supplied to the exhaust gas by the dosing unit if the detection unit assesses that the quality of the reducing agent is improper;
   wherein a magnitude of a measuring value captured within the predetermined period of time is related to an average or to a median of the magnitudes of the plurality of measuring values captured during the predetermined period of time and the related magnitude is utilized in assessing the quality of the reducing agent;
   wherein a difference between the magnitude of the measuring value to be related and the average or median is calculated in assessing the quality of the reducing agent.

* * * * *